(12) United States Patent
Marshall et al.

(10) Patent No.: US 8,224,350 B2
(45) Date of Patent: Jul. 17, 2012

(54) METHOD AND APPARATUS FOR DETERMINING LOCATION

(75) Inventors: Chris Marshall, Haywards Health (GB); Graham Thomason, Redhill (GB)

(73) Assignee: U-Blox A.G., Thalwil (CH)

( * ) Notice: Subject to any disclaimer, the term of this patent is extended or adjusted under 35 U.S.C. 154(b) by 58 days.

(21) Appl. No.: 12/993,459

(22) PCT Filed: May 22, 2009

(86) PCT No.: PCT/GB2009/050556
§ 371 (c)(1),
(2), (4) Date: Nov. 18, 2010

(87) PCT Pub. No.: WO2009/141660
PCT Pub. Date: Nov. 26, 2009

(65) Prior Publication Data
US 2011/0294516 A1 Dec. 1, 2011

(30) Foreign Application Priority Data
May 22, 2008 (GB) ................................. 0809302.3
Jun. 3, 2008 (GB) ................................. 0810095.0

(51) Int. Cl.
*H04W 64/00* (2009.01)
(52) U.S. Cl. .................. 455/456.1; 455/414.4; 375/220

(58) Field of Classification Search ............... 455/456.1, 455/433, 414.3, 414.4, 414.1; 375/220; 340/539.1; 379/92.02
See application file for complete search history.

(56) References Cited

U.S. PATENT DOCUMENTS

| | | | |
|---|---|---|---|
| 6,839,560 B1 | 1/2005 | Bahl et al. | |
| 7,917,130 B1 * | 3/2011 | Christensen et al. | 455/414.4 |
| 2002/0184418 A1 | 12/2002 | Blight | |
| 2003/0220116 A1 | 11/2003 | Sagefalk et al. | |
| 2006/0240841 A1 | 10/2006 | Bhattacharya | |
| 2007/0073937 A1 | 3/2007 | Feinberg et al. | |
| 2007/0081496 A1 | 4/2007 | Karge et al. | |
| 2008/0004037 A1 * | 1/2008 | Achlioptas et al. | 455/456.1 |

FOREIGN PATENT DOCUMENTS
GB 2 389 999 A 12/2003
* cited by examiner

*Primary Examiner* — Phuoc Doan
(74) *Attorney, Agent, or Firm* — Blakely, Sokoloff, Taylor & Zafman

(57) ABSTRACT

A method of determining the location of a portable device comprises obtaining identities of wireless communication devices detectable by the portable device at a particular location which is to be determined, thereby to obtain a set of identities. The set of identities is compared with the content of a database, which database stores a plurality of findings, to select one or more findings; each finding comprising a reference location and a set of identities of wireless communication devices sighted at that location. The location of the portable device is found based on processing the selected findings.

14 Claims, 3 Drawing Sheets

METHOD AND APPARATUS FOR DETERMINING LOCATION

This is a non-provisional application claiming the benefit of International application number PCT/GB2009/050556 filed May 22,2009.

This invention relates to positioning systems for portable devices.

The use of the global positioning system is becoming increasingly widespread in domestic portable products. However, the GPS system requires significant processing capability in the portable device. Furthermore, in built up areas, there may often be a poor view of the sky so that GPS signals cannot always be obtained.

It is known to supplement GPS data with another positioning system data, so that the overall reliability can be improved. For example, triangulation based on mobile telephone base station signals can be employed as a slightly less accurate temporary positioning system to provide additional robustness to the GPS system.

This invention relates to an alternative positioning system, which can be used as a stand alone system or to complement a satellite positioning system.

It has previously been proposed to provide a location beacon database to function as a positioning system. If the beacons are WiFi access points (APs), such a database contains their MAC addresses, calculated estimated positions of the APs, and possibly their power profiles, i.e. what signal strength can be expected at various locations around the AP. The database is usually derived from carrying out so-called "wardrives", gathering at known locations the identities of APs sighted and measurements of the AP signal strengths, and possibly other signal data (e.g. Doppler, error rate). The locations of sightings of APs may be determined by a GPS system.

Such a database is used when a user requires a position fix, especially when alternatives such as GPS are unavailable. The process of finding a fix is typically as follows in the prior art:

(i) scan for observable APs, with their signal strengths and other signal data, (ii) look up reference data about the location and possibly power profile of these APs in the database, and (iii) derive the estimated user position.

This approach however requires a large amount of data analysis.

In order to use deduced locations of the detected APs in the prior art method, a sufficient sample data must be gathered to enable the location of each AP to be deduced, before it can be used to assist in location. Thus, small sets of data relating to the detection of AP signals cannot reliably be used. There can also be difficulties of handling disjoint sets of detected signals by means of a model of an AP, although this can readily arise—for example if there are two separate patches of visibility of the AP.

According to the invention, there is provided a method of determining the location of a portable device, comprising:

obtaining identities of wireless communication devices detectable by the portable device at a particular location which is to be determined, thereby to obtain a set of identities;

comparing the set of identities with the content of a database, which database stores a plurality of findings, to select one or more findings; each finding comprising a reference location and a set of identities of wireless communication devices sighted at that location; and determining the location of the portable device based on processing the selected findings.

This method uses stored findings: a reference location with the set of wireless communication device identities sighted at that location. Such findings could be collected from a scan at reference locations carried out during e.g. a wardrive. Instead of processing position information concerning the estimated location of the sighted communication devices, the invention finds position based on processing of the identity of signals received at the reference locations directly. This provides a more reliable method of determining position and with improved ease of maintaining the database used.

By processing based on the identities (although optionally with additional data taken into account), rather than pre-stored locations of the communication devices, additional processing steps are avoided or handled in a simpler way. The approach of the invention does not require any knowledge or estimation where the sighted devices are located—the analysis is instead based only on whether or not wireless communications devices are observed.

The invention provides more direct matching of the scan results when trying to obtain a position fix with comparable information derived from reference location scans.

The location of the wireless communication devices is thus not used as the basis for the database to be used, but rather the identities of sets of devices previously sighted at known locations.

The wireless communication devices are typically wireless beacons or basestations, namely essentially static devices that broadcast signals (not excluding of course that they may be moved from one location to another, as can arise for a home WiFi AP).

In a simple example, determining the location can comprise:

reporting the location of a finding selected from a database because it includes the same wireless communication devices identities as are currently observable.

This approach provides a simple mapping between the determined location and a reference location (or locations) at which the same communication devices were detectable. An average location can be used when there is more than one matched finding. There may be reference locations where more communication devices were identified, than seen in the unknown location. The location can be derived from those reference locations having the best match.

A number of different algorithms can be used to determine the closest match or matches.

For example, determining the location can comprise:

selecting a location based on one or more reference locations, wherein the reference locations to be used are selected based on:

the number of devices detectable from the reference location which correspond to identities in the set;

the number of devices detectable from the reference location which do not correspond to any identities in the set; and the number of identities in the set which are not identified in the database as detectable from the reference location.

This approach essentially provides a Venn diagram operation, in which matches between devices seen from the reference location and devices seen from the current location are derived, as well as differences between these sightings.

The method used to estimate the unknown position can further comprise determining if one or more of the identities of the set should be disregarded. This may be useful if a communication device has moved location, and there is therefore a mismatch between its location when the communication device was identified at a reference location, and its subsequent position when the estimation of the unknown position is being attempted.

Obtaining the identities can be carried out by the portable device at the particular position, and processing the set of identities can be carried out at a different time and not at the same place as the position to be determined. This means the portable device can be provided with low computational capability and at the limit only needs to store the identities of devices detectable at a time when position information is desired.

The wireless communication device can comprise short range wireless access points, and the identities can comprise MAC addresses.

The invention also provides a positioning method, comprising:

populating a database with identities of wireless communication devices detectable from a plurality of reference locations; and determining the location of a portable device using the method of the invention.

This method encompasses the creation of the database and the subsequent use of the database in a positioning method.

The database content can be updated using the obtained identities of wireless communication devices detectable by the portable device, once the particular location has been determined. Thus, the database can be kept up to date simply by use of the positioning system.

The database can be (initially) populated by conducting a wardrive and/or by processing wireless communication device information received from other sources. For example, these other sources may be owners of the communications devices, and who are also subscribers to the positioning system (i.e. customers of the positioning system administrator).

The invention also provides a positioning method, comprising:

determining position based on a satellite positioning system; and determining location using the method of the invention to assist or enhance the position determination using the satellite positioning system.

This provides a system with two types of positioning system, so that the overall robustness/reliability of the system is improved.

Obtaining identities of detectable wireless communication devices can further comprise measuring one or more of:
 signal strength,
 signal to noise ratio,
 error rate,
 Doppler.

These can then be used as part of the matching algorithm, to enable a more accurate position fix to be obtained. The database content then includes, in respect of a signal of a given communication device from a given reference location, the same information.

The step of obtaining identities of wireless communication devices detectable by the portable device at a particular location which is to be determined can be carried out using a camera.

There is a trend towards the introduction of WiFi capability in cameras, and this capability can be used to implement a low cost positioning system, for appending position data to photographs (so-called geotagging). In one example, the identities (and any other data forming part of the matching algorithm) can be appended to an image file to enable subsequent analysis to determine the particular location. This provides a system in which the position data processing can be carried out on a separate device (e.g. central server providing the position decoding service). This reduces the computational requirements in the camera itself.

As an alternative to determining the identity locally, a sample of WiFi intermediate frequency (WiFi-IF) data may be stored so that the data can be extracted later.

The invention also provides a system for determining the location of a portable device, comprising:

the portable device, which comprises a wireless receiver for obtaining identities of wireless communication devices at a particular location thereby to obtain a set of identities;

a database which stores the identities of wireless communication devices detectable from a plurality of reference locations;

means for comparing the set of identities with the content of the database, means for determining the location of the portable device based on processing of one or more selected reference locations.

Examples of the invention will now be described in detail with reference to the accompanying drawings, in which.

Figure 1:
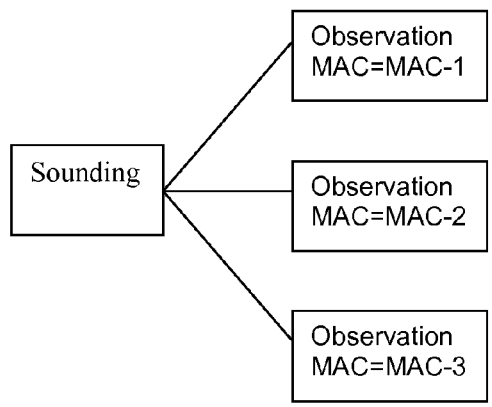
FIG. 1 shows the results of a scan which results in three observed wireless communication devices.

Before describing the invention in detail, a number of concepts and terms will be first be defined.

Beacon

Any wireless communication device, assumed to be normally stationary, that identifies itself in a form that can be detected by another device. An example is WiFi Access Points (APs), but by analogy, the invention is not limited to APs, and includes other beacons such as mobile phone base stations, television and radio transmitters, components of systems using Bluetooth, ZigBee, WiMAX and other microwave systems etc. It is assumed that any useful beacon has an identifier which can be regarded as unique (even if not absolutely so), e.g. APs can be reliably identified by their MAC addresses.

For Measurements Made when the Location of the Device is Known:

A Finding

A set of obtained beacon data (sightings) from a search at a single known location for potentially many beacons, along with data relating to that reference location and the collection of the data (time, method, etc.). The term Finding is used for active (where transmissions are used to request that beacons identify themselves) or passive (where the search only involves listening for beacons to announce themselves) searching. A finding implies one reference location (as does each sighting—see below).

A Sighting

The data associated with one beacon as a result of a search; this data may just be the beacon's identity but could include other characteristics (e.g. signal strength) as well. Each sighting is associated with a finding and therefore, by implication, a reference location.

A Reference Location

A known location at which a finding is carried out (and thus beacon information is gathered).

Wardrive

The use of a vehicle specifically to carry out findings at a series of locations and thus to acquire data on detectable beacons at known positions during the drive.

For Measurements Made when the Location of the Device is not Yet Known:

A Sounding

The result of (either actively or passively) scanning for beacons when a user wants to know the location. In general, several beacons will be detected and the data associated with each such detection is termed an observation.

An Observation

The data associated with one beacon as a result of a scan. In a context where location is not known, this is in a user situation and does not include the location where scanned.

Note that a search relates to the identification of beacons of known position, whereas a scan relates to the identification of beacons whose position is not yet known.

The invention provides a method of determining the location of a portable device in which identities of wireless communication devices detectable by the portable device at a particular location are obtained thereby to obtain a set of identities (this is a sounding as defined above).

The set of identities is analysed using a database which stores the identities of wireless communication devices detectable from a plurality of reference locations. The database thus contains the finding and sighting results of a wardrive. The location of the portable device is derived based on an analysis and processing of the reference locations associated with the finding and sighting results.

Before the system can be operable, the finding information needs to be gathered.

Gathering Finding Information

Auxiliary positioning capability is used during a wardrive, to acquire sightings of beacons. Various items of data are recorded, such as time and date of sighting, latitude, longitude, altitude, MAC addresses, signal strength, signal to noise ratio, signal error rate, signal Doppler (high Doppler shifts may indicate a passing mobile router, e.g. a router on a passing a train; alternatively the user may be on a train). The position may be known by:

(i) A GPS based fix obtained during normal usage of the device by a user, (ii) A GPS based fix from a dedicated wardrive, (iii) User input, (iv) A location fix from observations of previously identified beacons, (v) Inference from other information, for example distance and direction from a previously known location.

The database can include the data source(s), i.e. which of the above methods was used to gather the finding information. Optionally, the uncertainty of the estimated position may be estimated and recorded. The uncertainty may be small in the case of a GPS fix, or larger from alternative methods of position estimation.

The database can be populated based on information collected during a wardrive as explained above. However, other methods of populating the database can be used as well or instead. For example, a customer base may already have data available relating to their location and their WiFi node identity, and this data can be used to construct a reference location database, by assuming that the WiFi node will be detectable within a given distance from the node itself. Reference locations can then be derived.

If a database of estimated beacon positions is available in addition to a finding-based database, hybrid algorithms will be apparent to those skilled in the art. For example, independent fixes from the two databases could be averaged in some way. Alternatively, the estimated-beacon position database could be used to add pseudo-sightings to existing findings in the finding-based database, using an estimate of beacon range to determine eligibility for membership of the finding. This avoids creating new pseudo-reference locations (which would be another approach).

Generate Database

From the finding information (whether from a wardrive or derived from other data), a database is generated, again optionally together with uncertainty information. This database may be within the portable device itself, purely from its own finding information, or else (more preferably) the database information is shared with a database on a server. Alternatively, a new version of a shared database on a server could be occasionally downloaded to the portable device for subsequent use (e.g. when communications with the server were not possible). Similarly, new additions to a local database could occasionally be uploaded to a shared database on a server at convenient times. The processing necessary to determine location using the database may correspondingly be carried out on the device, or on the server.

Compress Database

The finding information can optionally be compressed, before or after forming the database. The compression is desirable to avoid duplicate or near duplicate information, to manage the size of the finding data, and to structure the information in a manner easy to use by the position fix matching process. Compression may be achieved for example by one or more of the following:

(i) Assigning into geographic regions.

The regions indicate the area within which a beacon has been sighted. The region could be three dimensional, such as an office block in which WiFi is provided over a number of floors, two dimensional, such as a station in which WiFi is provided, or linear, such as which a stretch of road, along which a beacon is visible.

(ii) Forming into clusters.

A group of sightings can be clustered into a composite sighting if they are located close together.

(iii) Idealize the database by quantization.

The quantization could be:

a) Rectangular grid-based, with a cell size of anything from a few meters to a few hundreds of meters or more, and need not be of constant cell size over the area covered, so that some regions would be more densely covered than others. Certain regions may have no coverage at all. The quantization does not necessarily mean that the idealized observations are snapped to the centre of the region. They may remain at a position nearer to where observed in the cell (which may correspond to a position on a road).

b) Based on other tessellating polygons or polyhedra for quantization. Triangles and hexagons have the advantage of being able to cover all latitudes and longitudes of a large spherical surface in a uniform way, (i.e. being all the same size) whereas with equally sized rectangles, there will necessarily be irregularities in the pattern, e.g. rectangles in an equatorial band and those in increasing latitude will necessarily be in bands of different numbers of rectangles, leading to an irregularly bonded brickwork appearance.

c) Based on Linear sample sets, with quantized spacing. This would be particularly appropriate for use for findings gathered when travelling along straight roads.

(iv) More sophisticated mixed data sets, for example using geographic features such as quantized position along mapped roads, or presence in regions such as buildings, car parks, etc.

The compression may take into account the uncertainty in the finding location estimate—for example by adding a boundary corresponding to the uncertainty to the edge of a region, clustering those finding reports within the uncertainty estimate, or using a quantization interval related to the uncertainty in the location estimate.

The steps above essentially set the infrastructure for the system of the invention, to enable the matching function to be performed.

A user operates the system, when in an unknown or uncertain location, simply by carrying out a sounding to observe beacons. The observed beacon data (the "observation") is matched against the database. A variety of algorithms is possible.

Some examples of algorithm are given below, but many variations are possible.

All algorithms produce a location, typically as latitude, longitude and altitude, and optionally with an estimate of the uncertainty. Optionally multiple outputs may be provided, for example with the most likely location, together with a larger region in which there is greater confidence that the search location is located.

In a first example, the algorithm finds one or more locations or location regions where the beacons sighted and the sighting data in the database from previous findings correspond to each other. Thus, a location is selected based on a reference location having the same set of beacon identities. A complete match is not essential to a successful position fix, as beacons are not always active. For example if the sounding results in observations of beacons {A, B, x}, then a location with a finding of {A, B, C} would be a successful match. In the case of this match, it is assumed that beacon C was active at the time of the finding, but is now switched off, and that beacon x has not been seen before. The match may take into account the uncertainty in the finding location points, and may also take into account the data source of the sightings Once a position has been established, there are a number of ways this can be presented to the user. The position fix can be provided to an application or to the user. In the case of a server implementation, it will be communicated back to the device from the server, or communicated to another service. This may for example then lead to the display of the position on a map or satellite photo or terrain model, or to other Location Based Services.

The user or application may interact with the position fix to refine it, or to change it in the light of additional information. Such changes may optionally be reported back to the processor database.

Following the position fix (and following any update by the user or application) any additional information and sightings may optionally be added to the database; now that the location of the search is known the results can be regarded as a useful beacon finding. For example, the observation of a previously unseen beacon can be treated as a sighting, and added to the database. Thus, the database will be kept dynamically up to date.

The example above is finding-based and matches the findings (of the wardrive) with the observations of the user. Of course, a direct match may not arise as mentioned above. A more complete approach will now be described.

Generally, given a sounding containing a number of observations, an algorithm needs to identify findings that contain at least one beacon in common. If there are findings that contain exactly the beacons seen in the observations, then these are selected. However, if there are instead findings that contain all the beacons seen in the observations (plus some others) then these are selected. In a refinement, only the findings that contain the least number of extraneous (non observed) beacons maybe selected.

If there are no findings which contain all the beacons, then the findings that contain the largest number of reference beacons in common are selected, and from those, the findings with the least number of extraneous (non observed) beacons may be selected.

The average of the locations of the findings selected can then be taken to provide the location estimate. An estimate of the error in the position can be defined as the region (or regions) containing the selected reference points, or the size of this region (which may be a circle or rectangle for example).

This is an example of quite a constrained algorithm, which looks for the occurrence of as closely as possible for locations where the combination of beacons has previously been observed.

A second example will be described to demonstrate how the closest match can be selected when there is less direct match between the finding and sounding.

It is assumed that the wireless communication devices are WiFi APs with MAC addresses. When a position fix is required, a scan is performed to obtain a sounding, consisting of several observations (in general), as shown in FIG. 1. In this example, a sounding has resulted in three observed wireless communication devices, with MAC addresses 1,2 and 3.

Figure 2:
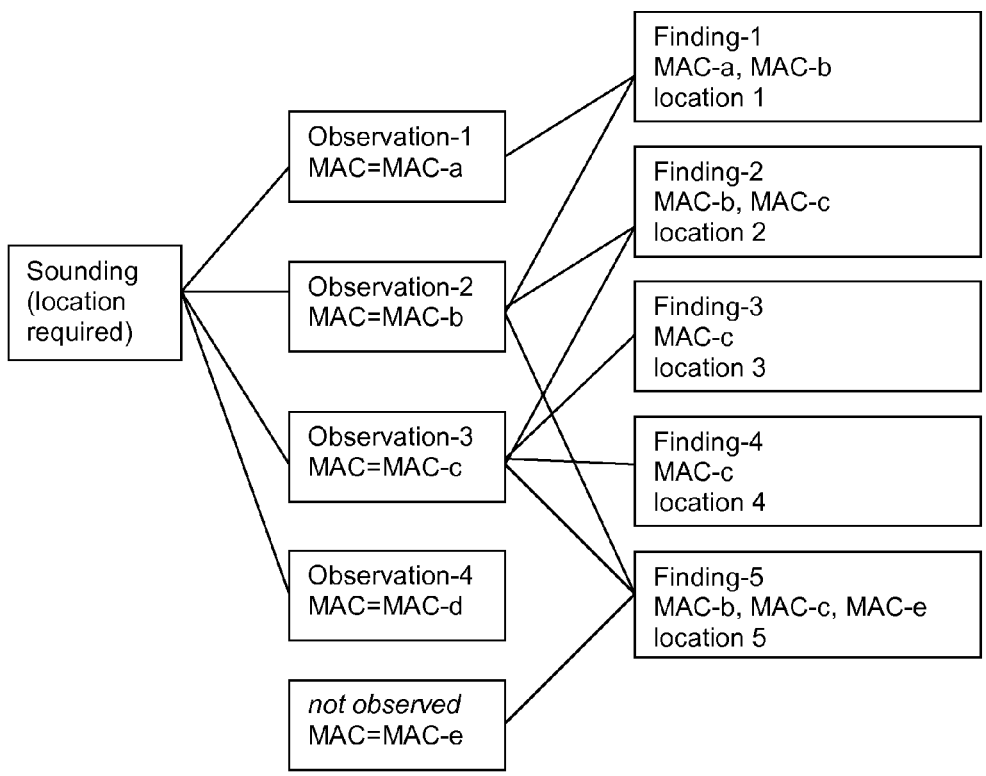
FIG. 2 shows data used by a processor implementing the method of the invention.

The database of findings is queried, which include any of the above MAC addresses and treat the findings as a mathematical set. Each finding consists of various MAC addresses. FIG. 2 shows the various data sets.

In this example, a sounding has observed MAC address a,b,c and d. The database includes five findings 1 to 5, but these only include MAC addresses a, b, c and e.

Thus, MAC address d was observed in the sounding, but was not contained in the database and does not therefore feature in any of the findings stored in the database.

Finding 5 sighted MAC-e, but MAC-e was not sounded.

This example shows the mismatch that may arise. MAC d may for example be a new WiFi AP not installed during the wardrive, and MAC e may have been turned off during the sounding, or been on but out of range at the place where the sounding took place.

Figure 3:
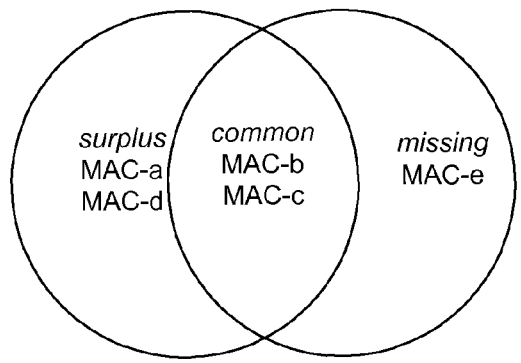
FIG. 3 is a Venn diagram to explain how soundings are processed.

The sounding is processed, with each finding to calculate the common, missing and surplus MAC addresses. This can be considered as a Venn diagram as shown in FIG. 3, which relates to Finding 5. In this example, there are 2 MAC addresses in common, 1 missing (in the finding but not observed), and 2 surplus (sounded but not in the finding under comparison). Clearly, any observation not in the database will be surplus with respect to every finding.

For each finding, a score can be calculated. A weighting can be applied as follows:
  the number of MAC addresses in common weighs heavily in a positive way.
  the number of surplus MAC addresses counts weakly negatively.
  the number of missing MAC addresses counts weakly negatively.

Figure 4:
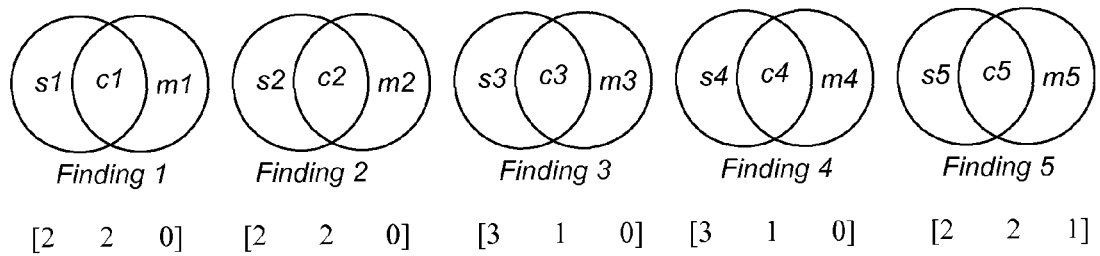
FIG. 4 shows a set of data variables resulting from the analysis of a sounding.

This gives the set of data variables shown in FIG. 4, as s1 to s5, c1 to c5 and m1 to m5 (s=surplus, c=common, m=missing). The number in brackets underneath is the corresponding number of elements.

The best findings in the above example would be Finding-1 and Finding-2, because they have 2 MAC addresses in common ($c1=c2=2$), with 2 surplus and 0 missing counting against them ($c1=c2=2$; $s1=s2=2$ $m1=m2=0$).

Finding 5 is a close second, having the same number of common and surplus MAC addresses, but it has the missing MAC address counting weakly against it.

Refinements in the matching and scoring process of this algorithm could include signal strength considerations, consideration of how up-to-date the findings are, and consideration of how the findings were obtained (wardrive with GPS, camera with GPS, inferred from being in common with located findings even without an explicit location, etc).

In principle only the findings with the best score can be used for the final stage of the fix algorithm, considered below.

Figure 5:
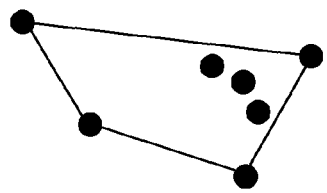
FIG. 5 is used to explain how a location can be derived using a centre of gravity.

The set of findings of equal score can be taken, and an average of the positions of the findings can be obtained, for example by a simple average or a weighted average, (using signal strength, signal to noise ratio, fuzzy date match, source of finding—e.g. camera, GPS tracking fix from wardrive—, or other criteria for the weighting). This is a different way of using signal strength (etc.) to using it in the best match stage. Here, the signal strength (etc.) is only used after the best set of findings has been obtained without regard to signal data. A centre of gravity of the points may be taken. Alternatively, a wireframe joining the points may then be taken. Alternatively again, and generally better, a centre of gravity of a polygonal envelope enclosing the location points may be taken. For example, as shown in FIG. 5, a centre of gravity of a non-re-entrant, non-concave, enclosing polygon with finding location points at vertices can be taken. This avoids the bias of multiple findings in very nearby places.

The findings can be quantized in time and/or space, either cumulatively or on extraction of a sub-database from a master database.

The algorithm requires that findings and soundings individually each contain several observations taken at (virtually) the same time and place. If the wardrive/acquisition tool is not capable of detecting several beacons in one go, this could be simulated by quantizing time and/or space. This algorithm shows robustness against a small proportion of beacons that move, because in many cases the stationary beacons will provide sufficient matching in the common area of the Venn diagrams. At any one point in a town or city, it may be possible to detect a dozen or more routers, and these will remain relatively static so that the database can be kept up to date to take account of changes at the same time as being used.

The example above is based on matching sightings with findings, but is finding-based in that the best findings are used to derive position. Instead, the algorithm can be sighting-based, as explained below.

Given a sounding containing a number of observations of beacons, the reference points for all sightings of these beacons can be derived. For example, the average reference location of the locations of the sightings selected can be taken. In other words, any finding including beacon x has its reference position taken into account for a sounding which observes beacon x. This simplifies the algorithm.

The estimate of the error is the region (or regions), circle or rectangle containing the selected reference points, or the size of this region, circle or rectangle. This is an example of a more robust algorithm, which will give a wider tolerance region encompassing the area in which any of the observed beacons has been sighted.

In order to reject rogue beacons (for example beacons that have moved since the findings were taken), each observed beacon can be rejected in turn, and the above algorithms can then be applied. The most aberrant of the resulting fixes—e.g. the one furthest from the centre of gravity of the fixes obtained, can then be determined. Unless the most aberrant fix is actually hardly aberrant at all, the corresponding beacon can be rejected. More than one beacon can be rejected if required. The fix can then be taken from the calculation having removed the effect of the rejected beacon.

The robustness will be improved by including signal strength, signal-to-noise, etc as weighting factors. In addition the changeability of the database in time can be considered, and the algorithm can aim to recognise and use/discard moving beacons.

The beacon-based position fix can be used within a GPS system when no GPS fix is available. The beacon based position fix can also be used to provide a position estimate for GPS to assist the GPS processing. Partial GPS results, such as 3 or 4 pseudo ranges, can be enhanced to provide a fix whereas the GPS partial data is not in itself sufficient to produce a fix. Alternatively, one refined fix can be derived from two fixes (on GPS fix and one beacon based fix).

The position determination method described above can be used in a camera to associate position information with a photo (or video). There is growing interest in this geo-tagging of photographs. At present, many photographs are tagged by hand, the taker knowing the location where taken. Other methods involve performing a GPS fix, either locally in the camera or later from stored IF data.

The method described above can be used to append a position stamp to an image file or a photo clip, but without requiring a GPS system. Instead of using a GPS antenna and a GPS RF front-end, the method of the invention (whilst not excluding the use of GPS equipment) only requires the camera to be equipped to detect WiFi access points and/or other beacon radio signals. It will be seen that this gives an alternative method of producing a position fix.

As mentioned above, GPS signals are not always present with sufficient quality. Indoors, the signals are weak or all but absent, depending on the thickness of walls and the material used (metal being completely opaque). Some signals may penetrate via reflected paths, which degrades the quality of a fix.

In urban environments, the view of the sky may be very limited, and there may not be sufficient satellites visible. The signals from some satellites may be present via reflections, possibly via several routes. All this militates against the ability to obtain (reliable) fixes. However, just where GPS position fixing is difficult or impossible, beacon signals such as those from WiFi access points may be abundant. In some cases, WiFi interfaces are standard equipment on digital cameras, and in this case no special hardware is required. The use of the method explained above can give energy consumption reduction compared to GPS approaches, especially where the fix is performed in the camera or an accessory.

Thus, in an aspect of the invention, an image capture method comprises capturing an image using a portable camera device at a particular location, obtaining identities of wireless communication devices detectable by the portable camera device at the particular location thereby to obtain a set of identities and appending the identities to the image file to enable subsequent analysis to determine the particular location. The camera can have a Wifi radio interface for this purpose.

Upon a user taking a photo, an image file is created containing that photo. The scanning for MAC addresses (and optionally other related data) of routers is carried out, those MAC addresses are stored and linked to the image file of the relevant photo. Time and date can also be recorded.

The method above obtains a position fix, which is appended to the image file. The method is analogously applicable to video clips, and alternative radio/microwave beacons with their own identification.

As for the general example above, the processing of MAC addresses (and/or GPS IF data) can be carried out locally in the camera if a local database is available, or on a PC at home, where a database is available local to the PC, or on a PC at home, with connectivity to a server. Instead, the processing may be entirely remotely on a server, for example with the camera connecting directly to the server using its WiFi access.

Scanning for beacons can be carried out at precisely the same time as the start of IF GPS capture. Some beacons may provide accurate timing information, which could then be useful as assistance to a GPS fix.

The positioning information can be shared to improve the robustness. For example photo 1 may prompt production of a GPS fix and detection of certain MAC addresses which are otherwise unknown to the MAC address reference database. If a subsequent photo 2 cannot obtain a GPS fix, but sees the same, or some of the same MAC addresses as in photo 1, then the information from photo 1 can assist in the processing. The MAC address reference database may be updated with the MAC addresses from Photo 1 as previously explained, but this updating may be a separate nightly batch process. However, on processing photos in a bunch from one user, the new MAC addresses could be used in local processing and a position fix for photo 2 given. This could be implemented whatever order the photos are presented in, since photos that are not fixable in a first pass can be revisited when others have been processed.

Figure 6:
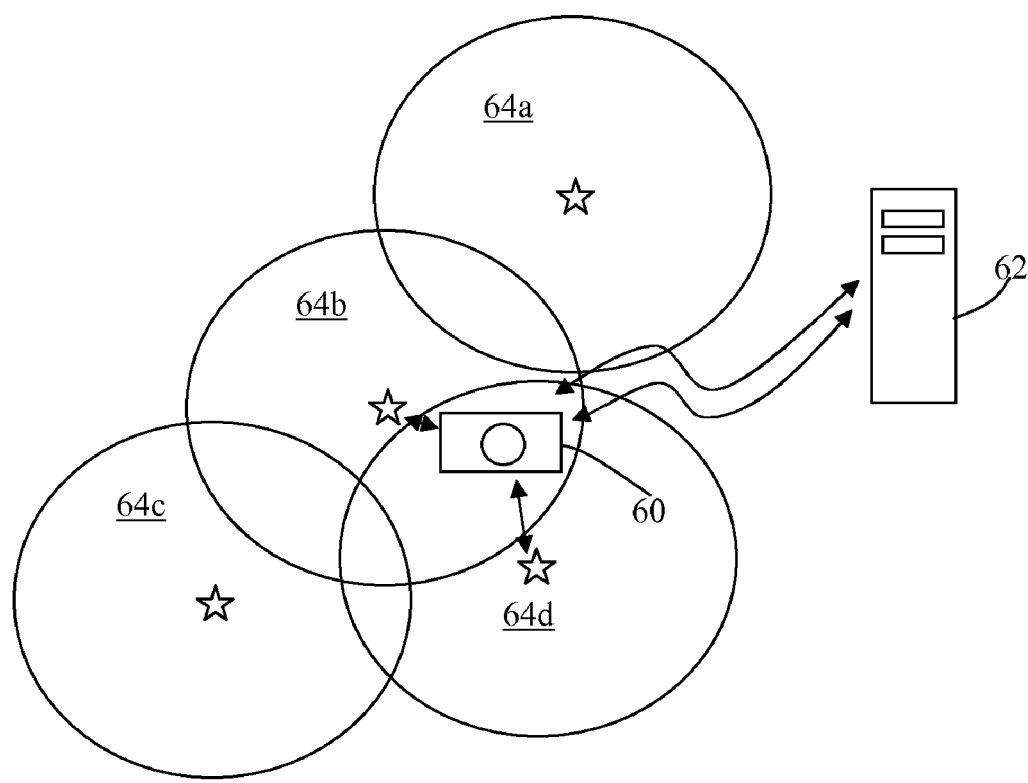
FIG. 6 shows an example of system of the invention.

FIG. 6 shows a system of the invention. A portable device, shown as a camera, but very likely to be a Personal navigation device (PND) or laptop, 60 has wireless receiving capability and is surrounded by four APs, with transmission areas 64a to 64d. The communication devices with ranges 64b and 64d are detectable by the portable device at its location, and these form a set of device identities. A database is provided as a remote server 62 in this example and stores the identities of the wireless communication devices detectable from reference locations. The server implements the algorithm for analysing the set of identities using the database content to determine the location of the portable device based on an analysis and processing of the reference locations.

The invention can be applied to in-vehicle navigation systems, for use in cameras (including video cameras), where the beacon identifications (and any additional data) are obtained and stored along with a photo or video. Geo-tagged photos can then be presented in conjunction with maps or satellite pictures or terrain/building models.

The idea can be used in PCs, for locating the user when indoors. Indeed, the invention can be applied to any situation where a position fix is required, and the user has a device capable of detecting beacons and processing the observations against an accessible database. Users might include pedestrians, joggers, etc.

As mentioned above, the beacon based positioning system uses terrestrial rather than satellite beacons. These can be in any form, although the preferred implementation uses short range beacons such as WiFi nodes (i.e. APs). In general, beacons with a range of less than 200 m are used in domestic environments, and typically the range is less than 100 m, and even below 50 m in a building environment. Many such beacons can be found in a small geographical area, which assists the matching process of the invention.

Although the preferred implementation uses these short range beacons, the principles of the invention can be applied to other types of communication device, such as mobile phone cells (which have an identity in the form of a cell ID), radio/TV mast signals, DAB signals, WiMax (Worldwide Interoperability for Microwave Access) signals, Bluetooth and Zigbee signals. The wireless communication devices are typically RF devices, but again the principles of the invention can be applied to other types of signal, such as IR and sonic signals. These are all intended to be included within the term "wireless", which simply indicates that the signals can be received by a portable device without requiring a physical (i.e. wired) connection to the transmitting communication device.

The invention can be implemented with different types of device, namely a mixture of the different types of device outlined above.

Various modifications will be apparent to those skilled in the art.

The invention claimed is:

1. A method of determining the location of a portable device, comprising:
   obtaining identities of wireless communication devices detectable by the portable device at a particular location which is to be determined, thereby to obtain a set of identities;
   comparing the set of identities with the content of a database, which database stores a plurality of findings, to select one or more findings; each finding comprising a reference location and a set of identities of wireless communication devices sighted at that location; and
   determining the location of the portable device based on processing the selected findings, comprising selecting a location based on one or more reference locations,
   wherein the reference locations to be used are those associated with findings based on:
   the number of devices associated to the finding which correspond to identities in the set;
   the number of devices associated to the finding which do not correspond to any identities in the set; and
   the number of identities in the set which are not identified in the database as being associated to the finding.

2. A method as claimed in claim 1, wherein deriving a location from a plurality of reference locations comprises obtaining an average location from those reference locations.

3. A method as claimed in claim 1, further comprising determining if one or more of the identities of the set should be disregarded.

4. A method as claimed in claim 1, wherein obtaining the identities is carried out by the portable device at the particular position, and determining the location is carried out at a different time and without requiring the portable device location at the time of the location determination to correspond to the particular position.

5. A method as claimed in claim 1, wherein the wireless communication devices comprise short range wireless access points, and the identities comprises MAC addresses.

6. A positioning method comprising:
   populating a database with identities of wireless communication devices detectable at a plurality of reference locations; and
   determining the location of a portable device using the method of claim 1.

7. A positioning method as claimed in claim 6, wherein the database content is updated using the obtained identities of wireless communication devices detectable by the portable device, once the particular location has been determined.

8. A positioning method as claimed in claim 6, wherein the database is populated by conducting a wardrive and/or by processing wireless communication device information received from other sources.

9. A positioning method, comprising:
   determining position based on a satellite positioning system; and
   determining location using the method as claimed in claim 1 to assist or enhance the position determination using the satellite positioning system.

10. A method as claimed in claim 1, wherein obtaining identities of detectable wireless communication devices further comprises measuring one or more of:
    signal strength,
    signal to noise ratio,
    error rate,
    Doppler frequency.

11. A method as claimed in claim 1, wherein the database content includes, in respect of a signal of a given communication device from a given reference location, one or more of:
    signal strength,
    signal to noise ratio,
    error rate,
    Doppler frequency.

12. A method as claimed in claim 1, wherein the step of obtaining identities of wireless communication devices detectable by the portable device at a particular location which is to be determined is carried out using a camera.

13. A method as claimed in claim 12, further comprising appending the identities to an image file to enable subsequent analysis to determine the particular location.

14. A system for determining the location of a portable device, comprising:
    the portable device, which comprises a wireless receiver for obtaining identities of wireless communication devices detectable by the portable device at a particular location thereby to obtain a set of identities;
    a database which stores the identities of wireless communication devices detectable at a plurality of reference locations;
    comparison means, for comparing the set of identities with the content of the database,
    location-determination means, for determining the location of the portable device, comprising selecting a location based on one or more reference locations,
    wherein the reference locations to be used are those associated with findings based on:
    the number of devices associated to the finding which correspond to identities in the set;
    the number of devices associated to the finding which do not correspond to any identities in the set; and
    the number of identities in the set which are not identified in the database as being associated to the finding.

* * * * *